(12) United States Patent
Henriksen et al.

(10) Patent No.: US 7,807,224 B2
(45) Date of Patent: Oct. 5, 2010

(54) PROCESS FOR TREATMENT OF WOOD USING A CARRIER FLUID UNDER HIGH PRESSURE WITHOUT DAMAGING THE WOOD

(75) Inventors: Ole Henriksen, Ålborg (DK); Tommy Larsen, Slagelse (DK); Steen Brummersted Iversen, Vedbaek (DK); Karsten Felsvang, Allerød (DK)

(73) Assignee: VKR Holding A/S, Soeborg (DK)

( * ) Notice: Subject to any disclaimer, the term of this patent is extended or adjusted under 35 U.S.C. 154(b) by 1331 days.

(21) Appl. No.: 10/513,671

(22) PCT Filed: May 8, 2003

(86) PCT No.: PCT/DK03/00306

§ 371 (c)(1),
(2), (4) Date: Mar. 2, 2005

(87) PCT Pub. No.: WO03/095165

PCT Pub. Date: Nov. 20, 2003

(65) Prior Publication Data

US 2005/0208317 A1    Sep. 22, 2005

(30) Foreign Application Priority Data

May 8, 2002 (DK) .................... 2002 00700
Jul. 16, 2002 (DK) .................... 2002 01107

(51) Int. Cl.
*B05D 1/18* (2006.01)
*B05D 3/02* (2006.01)

(52) U.S. Cl. ............... 427/254; 427/440; 427/297; 427/430.1; 427/393; 427/397; 428/537.1

(58) Field of Classification Search ............ 427/440, 427/254, 430.1, 393, 397; 428/537.1
See application file for complete search history.

(56) References Cited

U.S. PATENT DOCUMENTS 4,308,200 A    12/1981    Fremont (Continued)

FOREIGN PATENT DOCUMENTS

DE    42 02 320    8/1993

(Continued)

OTHER PUBLICATIONS

"Development of New Treatment Processes for Wood Protection", J.J. Morrell and K.L. Levien, Conference report from "Conference on Wood Preservation in the 90's and Beyond", pp. 135-141, Savannah, GA Sep. 26-28, 1994.

(Continued)

*Primary Examiner*—Michael Barr
*Assistant Examiner*—Ryan Schiro
(74) *Attorney, Agent, or Firm*—Merek, Blackmon & Voorhees, LLC

(57) ABSTRACT

A process for treatment of wood susceptible to damage and having a length that is over the critical length with a fluid under high pressure is disclosed. The process is conducted in a way so that the fluid is not allowed to enter into the liquid form inside the wood. In one embodiment the process is performed in a way so the temperature during the pressurizing is not allowed to exceed the plastification temperature of the wood. In this embodiment the rate of damages of the wood is even further reduced.

21 Claims, 4 Drawing Sheets

U.S. PATENT DOCUMENTS 5,364,475 A  11/1994  Levien et al.

FOREIGN PATENT DOCUMENTS

| JP | 8-276405 | 10/1996 |
| WO | 00 27601 | 5/2000 |
| WO | WO 00/27601 | 5/2000 |
| WO | WO 0027601 | * 5/2000 |

OTHER PUBLICATIONS

"The Effects of Supercritical $CO_2$ on the Bending Properties of Four Refractory Wood Species", Anderson et al., Forest Products Journal, Nov./Dec. 2000, pp. 85-93.

Kono Toshio; English Translation of JP8-276405A Abstract; Publication Date Oct. 22, 1996.

* cited by examiner

PROCESS FOR TREATMENT OF WOOD USING A CARRIER FLUID UNDER HIGH PRESSURE WITHOUT DAMAGING THE WOOD

The invention relates to treatments of wood with a carrier fluid under high pressure conditions, in particular supercritical conditions. More in particular the invention relates to measures and procedures to be taken in order to avoid damage of the wood during the treatment with a supercritical fluid, preferably carbon dioxide.

BACKGROUND FOR THE INVENTION

Carrier fluids under high pressure, such as under supercritical conditions, are increasingly employed in wood treatment processes for impregnative or extractive purposes. Fluids under high pressure have properties partly similar to both gases and liquids. Thus the penetration properties of supercritical fluids are similar to gases whereas the solubilisation properties are similar to liquids.

Carbon dioxide is a very attractive compound for use as a supercritical medium for treatment of wood because of a suitable critical point (31° C., 73 bar), a low chemical reactivity and a low toxicity. Further carbon dioxide is available in large quantities at a relative low cost.

An article of Morrell and Levien: "Development of New Treatment Processes for Wood Protection" Conference report from "Conference on Wood Preservation in the '90s and Beyond" Savannah, Ga., USA, Sep. 26-28, 1994, deals with impregnation of wood species normally resistant to impregnation, by using supercritical carbon dioxide to deliver and deposit biocide into said wood. In the paper experiments are described where wood samples of 100 mm or less are used for the impregnation.

U.S. Pat. No. 5,364,475 describes a process for removing chemical preservatives by extraction using supercritical carbon dioxide as the extractive medium and wood samples of a size of 10×50 mm.

WO 00/27601 discloses an impregnation of wood using supercritical carbon dioxide where the pressure is released after the treatment in a pulsating way in order to avoid or reduce resin exudation to the surface of the wood.

In the literature there have been reports of change of mechanical properties of wood samples treated under supercritical conditions.

In Anderson et. al. 2000, Forest Products Journal, 50:85-93, it is described that the mechanical properties are affected by the supercritical treatment. Western red cedar showed a reduction of up to 23.1% of modulus of rupture and up to 13.7% reduction in modulus of elasticity. Further it is described that some samples exhibited dramatic treatment defects and were spilt into hundreds of long slender sticks. It was further described that a relationship exists between sample size and damages to the wood, where larger samples are more damaged that smaller samples. The observed damages were allegedly caused by pressure gradients inside the wood.

SHORT DESCRIPTION OF THE INVENTION

An object of the present invention is to provide a process for treatment of wood susceptible to damage under high pressure, such as under supercritical conditions, where damages are avoided or reduced. In a particular preferred embodiment the wood being treated is having a length above a critical length.

In one preferred embodiment an object of the invention is a method comprising following steps:
 a) a vessel is charged with wood to be treated;
 b) the vessel is pressurized using the carrier fluid until the treatment pressure is reached;
 c) a holding period where the pressure is essentially constant or the pressure changes at a low rate;
 d) depressurising the vessel to ambient temperature followed by removal of the treated wood.

The present inventor has realized that, when the length of wood samples increases, there is a certain length where the incidence of damage to the wood increases steeply. This length is defined in this description as the critical length.

This object is achieved by a method for high pressure treatment where the fluid is not allowed to enter into the liquid phase at any place or time during the process.

In one preferred embodiment the process is performed in a way so the temperature of the wood to be treated does not exceed the plastification temperature of the wood during pressurizing of the vessel wherein the treatment is to take place.

In another preferred embodiment the process is performed in a way so the temperature of the wood to be treated does not exceed the plastification temperature of the wood during pressurizing and the depressurising of the treatment vessel.

The invention is based on the realization that fluids, suitable for high pressure treatments, in particular supercritical treatments, in liquid form has a significant lower penetration than in the gaseous or supercritical state, and consequently may said fluid in liquid form be trapped inside the wood and cause the formation of excessive pressure gradients which may lead to damages of the wood.

Alternatively condensed liquid may undergo a significant volume change if the temperature is increased subsequently during the pressure cycle. The latter may also cause significant pressure gradients and lead to damage.

Further it has been realized that when the temperature of the wood exceeds the plastification temperature the wood becomes susceptible to damage by even modest pressure gradients.

Thus one object of the invention is to provide a process for treatment of wood using a carrier medium under high pressure in particular under supercritical conditions, with avoidance of damage of the wood being treated.

In one embodiment the invention relates to a method for treatment of wood susceptible to damage comprising the following steps:
 a) a vessel is charged with wood to be treated
 b) the vessel is pressurized with a fluid optionally containing a dissolved active compound, until the treatment pressure is reached
 c) a holding period where the pressure is substantially constant
 d) depressurising the vessel to ambient pressure wherein the temperature is controlled in such a manner that the fluid is not allowed to exist in liquid form in the wood.

Carbon dioxide is a preferred medium to be used as carrier medium according the invention.

Another object of the invention is to provide a method for determining a suitable pressurizing and depressurising course for a treatment of wood.

Further objects of the invention are to provide methods for de-pressurizing a treatment chamber for treatment of wood by supercritical carbon dioxide in order to avoid damage of the wood.

As the invention is concerned with the pressurizing and de-pressurizing of the vessel containing wood it applies to any process where wood is treated in a vessel using a fluid under high pressure, the invention relates in particular to impregnation, dying, drying and extraction processes.

In some embodiments raising the temperature above the plastification temperature may provide for a higher deposition and/or a better adhesion of the active compound in the wood. Such embodiments are also contemplated as being part of the invention.

It is important that the temperature raise above the plastification temperature is performed when no steep pressure gradients are present in the wood, such as in the holding period of the treatment process.

SHORT DESCRIPTION OF THE DRAWINGS

DETAILED DESCRIPTION OF THE INVENTION

Figure 1:
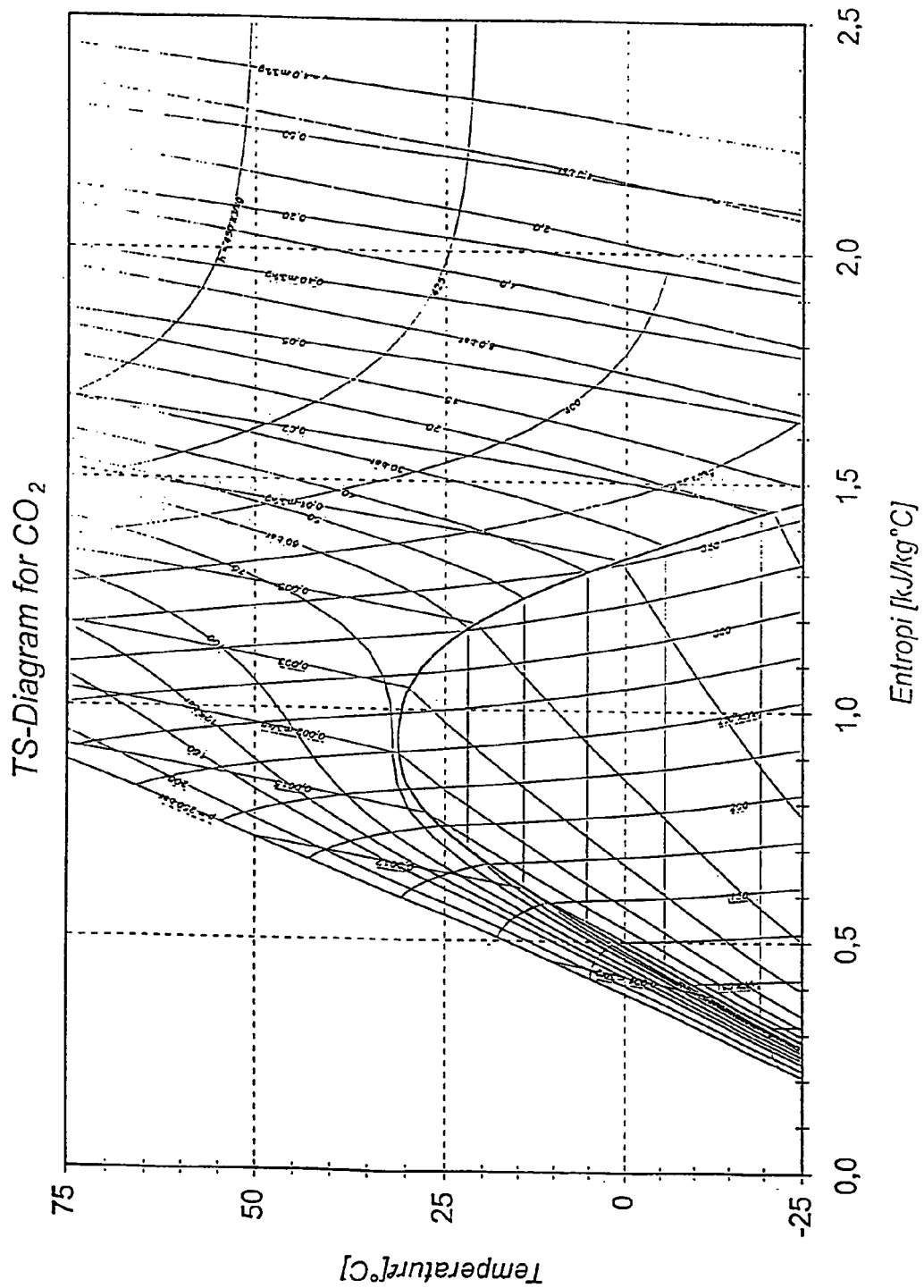
FIG. 1 shows a temperature-entropy diagram (TS-diagram) for carbon dioxide where the border between the supercritical state and the liquid state is indicated with a thick line.

Treatment of wood using a carrier medium under high pressure has in the recent years been extensive explored in order to exploit the benefits of carrier media under high pressure. In particular carrier media under supercritical conditions having penetration properties similar to a gas and solubility properties as a liquid have been explored.

The treatment procedure is usually divided in at least three different functional steps or periods, a pressurizing step, where the pressure in the treatment vessel increases from ambient pressure to the treatment pressure; a holding period where the pressure is relative constant and wherein the compounds to be deposited in the wood are deposited; and finally a depressurizing step where the pressure is decreased to ambient pressure again.

Even though the pressure during the holding period not necessary will be constant the pressure variations and thus the pressure gradients in the vessel and inside the wood will be relative small compared with the situations during pressurizing and depressurising.

Even though it is described that the deposition takes place during the holding period, it will be appreciated that some deposition may also take place during the pressurizing and depressurising steps.

In the present application the term carrier or carrier medium is intended to mean a fluid in form of a gas or in the supercritical state used for the particular treatment. Depending on the particular use the carrier will serve as solvent for the active compounds to be delivered to the wood in case of a impregnation process or as solvent for the compounds to be dissolved from the wood in case of an extraction process.

The carrier may comprise further components depending on the particular treatment procedure to be performed, such as active components to be deposited in the wood, cosolvents to facilitate the dissolution of the active components or to facilitate extraction of particular components from the wood. The skilled person may suggest further components that may be comprised in the carrier.

In accordance with the present invention the treatment using the carrier medium takes place under high pressure. Carriers under high pressure or in the supercritical conditions are also in the literature occasionally called dense gases.

Even though the present description is mainly explained in relation to carriers under supercritical conditions, the skilled person will appreciate that the conditions leading to damages in the treated wood similarly apply to carriers under high pressure but below supercritical conditions, and therefore the present application relates to treatment processes using a carrier media under high pressure regardless if the carrier is in the supercritical state or not.

A process taking place under high pressure is according to the invention intended to mean that the pressure in the treatment plant in at least one period during the treatment process is significantly higher that ambient pressure. In particular the pressure is at least 20 bar above ambient pressure, preferably at least 40 bar above ambient pressure, more preferred more that 60 bar above ambient pressure, and in a particular preferred embodiment more that 80 bar above ambient pressure.

In a preferred embodiment the treatment takes place at a pressure in the range of 85-300 bar, preferably 100-200 bar, more preferred in the range of 120-170 bar and most preferred in the range of 140-160 bar.

The term "penetration" is according to the invention intended to mean the property of the carrier fluid to enter into the wood being treated. Thus a fluid that enters into a compartment of the wood located at a long distance from the surface has better penetration properties than a fluid that under same conditions only enters into compartments of the wood located closer to the surface.

A fluid in the gaseous or supercritical state has significantly better penetration properties than same fluid in the liquid state.

The term "permeability" is according to the invention intended to mean a property of the wood describing the resistance against the penetration of a fluid in said wood. Thus wood species having high permeability exerts a lower resistance to the penetration of a fluid than wood species having a low permeability.

The carrier medium to be used according to the invention may in principle be any suitable carrier having the desired dissolution properties for the intended use. It is preferred to use a medium having a critical point at a low temperature and low pressure in order to avoid to high temperature or to high pressure. Thus a medium having a critical point at a temperature of 20-50° C. and a pressure of 5-100 bars is preferred.

Suitable carriers will be known in the art. It is within the skills of the average practitioner to select a suitable carrier for an intended use.

Examples of useable carriers according to the invention are known for the person skilled in the art. Carbon dioxide is a preferred carrier.

The present invention prescribes measures for avoiding to damage wood during a treatment under high pressure. Thus the skilled person will realize that the invention may be used for any treatment of wood under high pressure.

The treatment may be an impregnation process where one or more active compounds are deposited in the wood. These active compounds may be biocides, fungicides, insecticides, colorants, fire retarding compounds, strength improving compounds etc.

The treatment may be an extraction process where particular compounds are extracted from the wood, such as resin, terpenes etc., or it may be toxic compounds that have to be removed from wood before disposal of the wood.

In handling media at high pressures it is known that by raising the pressure of a gas the temperature will increase and by reducing the pressure the temperature will decrease. These properties are well known from physical teachings describing behaviour of gases (such as the Joule-Thomson effect).

Consequently, the person skilled in the art will appreciate that a carrier medium used under high pressure conditions may during treatment enter into the liquid state because of a drop in temperature effected by a drop in pressure.

If the temperature drop inside the wood allows the carrier to exist in liquid form a dramatic change will happen. The liquid carrier having a significant lower penetration in the wood will be trapped inside the wood and as the carrier is removed from the vessel a increasingly steeper pressure gradient is formed from the inner of the wood where the liquid is trapped to the outside of the wood from where the carrier is removed. This pressure gradient may eventually lead to a rupture and damage of the wood if the wood is of a species that is susceptible to damage.

Contrary, if the carrier is maintained in a gaseous or supercritical state the penetration of the carrier in the wood is so high that it may escape without damaging the wood or only damaging the wood in a much lower extent.

Wood, as a natural material, is not very homogeneous and it will as it is known vary between different trees and sources due to different weathering conditions, ground characteristics, genetic background etc. Further as the growth of trees is a multi annual process, the properties of a single wood sample may vary due to changing weather.

Therefore is wood inherently inhomogeneous and it will be possible to find a sample of wood that will withstand a treatment that will damage another sample, even though the two samples may originate from the same species.

The structure and architecture of wood is well known with long fibres in the axial direction arranged in a characteristic pattern with annular rings. This structure leads to very different permeabilities in the axial and the radial directions where the permeability in the axial direction is significant larger that in the radial direction. It is assumed that the permeability in the axial direction is 10-20 fold or more, greater than in the radial direction. However the invention is not intended to be limited to any particular theory.

Under pressurizing and depressurising it is believed that the carrier fluid enters into the wood and flows axially and/or radically through the wood, and that the cell walls of the wood form the observed resistance against the flow. Thus during pressurizing and depressurising gradients are formed from cell to cell throughout the wood.

As a consequence of the dominating flow in the axial direction the person skilled in the art will appreciate that steeper pressure gradients between the central part of wood and the outside will be formed in long specimens compared to shorter specimens.

This leads to the expectation that large wood pieces should be more susceptible to damages during treatment using carriers under high pressure. In fact the connection between length of the specimens and the susceptibility for damages can be observed experimentally.

One may define a critical length for specimens of a susceptible wood species, which define the length where susceptibility to damages occurs. In order to treat specimens above said critical length particular measures have to be taken in order to avoid damaging the wood whereas for specimens below that length no such measures are needed. Due to variation of wood within a batch such a limit may be broad. For use according to the invention the critical length is defined as the length where the susceptibility to damage in the batch is at an acceptable level e.g. damages are observed at a frequency of less than 5%, preferably less that 2%, where the frequency is understood as the frequency of boards having one or more damages.

The critical length will vary between different species of wood and may even vary within one species depending of growth place and conditions determined e.g. by the latitude where the particular wood has grown. The critical length for a given batch of wood may be determined by impregnating samples having different lengths under supercritical conditions, with fast and uninterrupted withdrawal of the supercritical fluid after impregnation, followed by visual inspection of the samples to establish the critical length above which the samples are damaged in severe degree.

For example can the critical length be determined by impregnating the samples at a pressure of 85-150 bar and at a temperature of 40-60° C., releasing the pressure down to 20 bar over 40-60 minutes and finally releasing the pressure to 1 bar over 40 minutes, followed by visual inspection of the samples.

Typically critical lengths are found in the range, of 0.4-6 m, more typically 0.5-3 m.

The critical length may vary with the water content of the wood. Further the critical length may depend on the particular pressure temperature profile selected.

For example has it been established that for sprouse samples from Lilleheden, Denmark the critical length was found to be 1.2 m.

In absence of experimental data it can for practical purposes be assumed that the critical length for a given batch is 1 m.

Different wood species show different susceptibility for damage during treatments with supercritical fluids. Some species are very resistant to damages whereas other species are susceptible. It is assumed that the factors determining if a given wood species is susceptible or not lies in the structure of the wood even though the determining factor is not explicitly known.

Wood species that are susceptible to damage is according to the invention also called refractory species.

Thus the skilled person will appreciate from the teaching of the present description that a wood article is a susceptible wood article if the article originate from a refractory species and the dimension of the article is so that the length of the article exceeds the critical length for the particular species.

In order to determine if a wood species is a refractory specie, a suitable numbers of specimens thereof can be put under pressure using the carrier fluid in question and depressurised in a short time and subsequently the specimens are examined for damages. For example samples can be pressurized with carbon dioxide to 150 bars at 35° C. and depressurised in 30 min and subsequently examined for damages. If the number of damages observed after this treatment is above the selected limit the wood is of a refractory species.

Examples of refractory species of wood according to the invention are: spruce, Western red cedar and Engelman Spruce.

According to the present invention damages of wood caused by supercritical treatment can have different impact. The damages can be observed as reduction of strength, reduction of elasticity, cracks, compressions or ruptures of the wood structure where the wood is fragmented into numerous long slender sticks. For the purpose of this invention there is no distinction between the various forms for damages and they are all referred to simply as "damage".

When a piece of wood pressurized by a carrier medium e.g. carbon dioxide is depressurised different temperature-entropy paths may be followed depending on the location in the wood. In a central cell of the wood the depressurising is assumed to be essentially iso-entropic i.e. following a path corresponding to path A in FIG. 2. In cells lying outside the central cells carbon dioxide is coming from the inner cells and simultaneously carbon dioxide is flowing out of the cells in question, and therefore the depressurising is no longer iso-entropic but follows a path similar to path B or C in FIG. 2, where path B represent a cell located closer to the central cell that the cell represented by path C.

Figure 2:
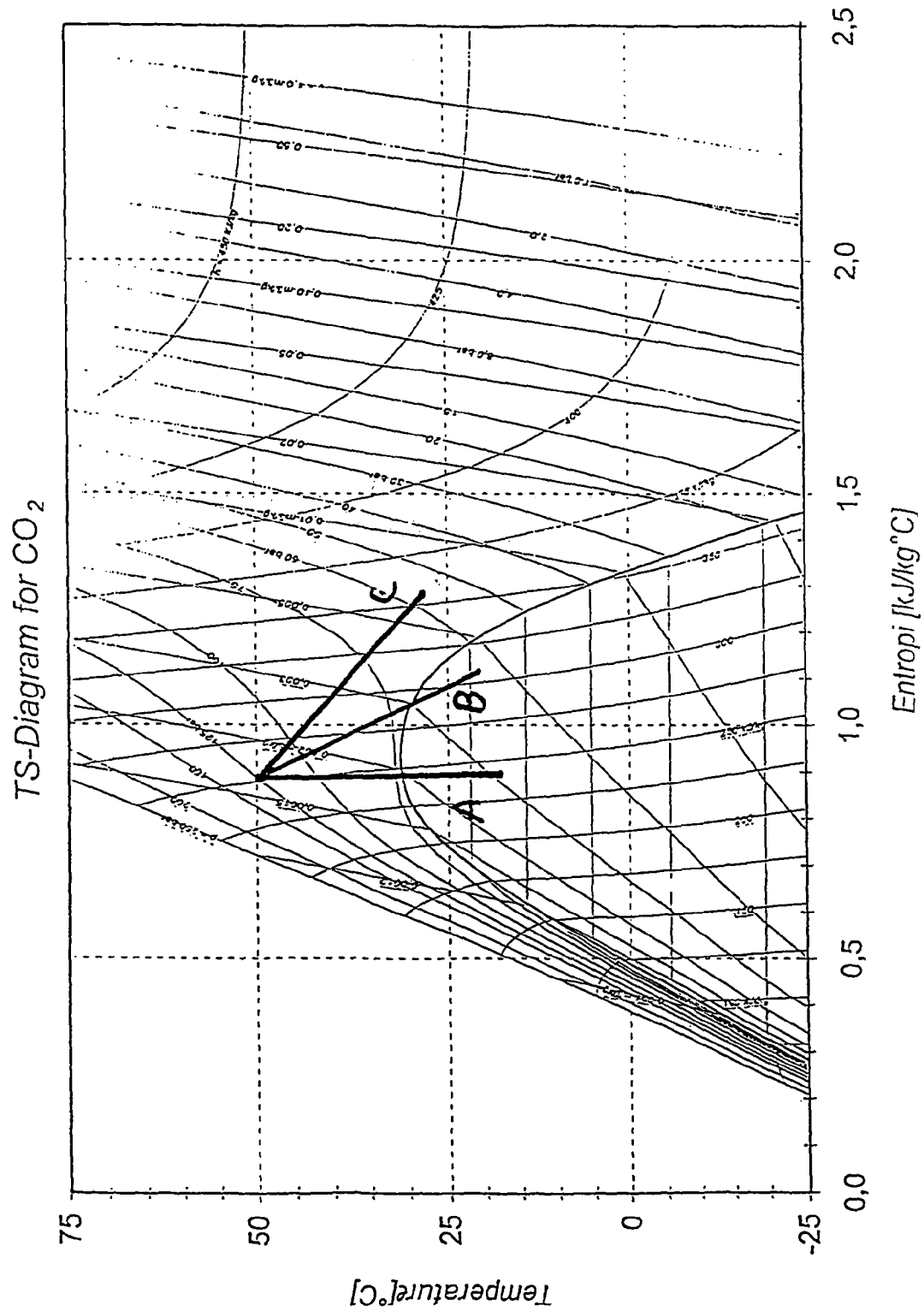
FIG. 2 shows a TS diagram for carbon dioxide with indication of three different paths A, B and C respectively, for depressurising.

As is can be seen from FIG. 2, path A and B crosses the thick line separating the liquid and the supercritical condition, and therefore will liquid carbon dioxide be formed in this cell. The formation of liquid carbon dioxide has dramatic consequences because the penetration of liquid carbon dioxide in wood is significant lower that the penetration of supercritical carbon dioxide in wood, and consequently the release of carbon dioxide from said cell is significant reduced. As a consequence a very steep pressure gradient is formed between said cell and the surroundings, which may lead to a rupture and damaging the wood.

According to the invention damaging during supercritical treatment of wood susceptible to damage and having a length over the critical length is avoided or reduced by performing the treatment in a way so that the supercritical fluid is not allowed to exist in its liquid form inside the wood.

The person skilled in the art will know how to interpret a Temperature-Entropy diagram (TS-diagram) as shown in FIG. 1 or similar, and will know in which state the compound in question exists in different areas or the diagram. In particular he will know the border between the supercritical state and the liquid state, which border must not be crossed according to the present invention. Thus the task for the person skilled in the art is to select conditions and a path for depressurising that do not cross said border.

The inventor has further realized that in addition to damages occurring because the fluid used as supercritical fluid is trapped in liquid form inside the wood, further damages may occur during pressurizing or depressurizing of the wood. In particular it has been realized that damages occur during pressurizing or depressurizing dependent on the temperature of the wood, where the wood will be more damaged if the temperature is increased above the plastification temperature of the wood.

The plastification temperature of the wood is defined as the temperature where the wood becomes deformable by small pressure differences. The skilled persons will appreciate that the plastification temperature according to the invention corresponds to the temperature needed for deformation of wood using a usual steam box, and will further appreciate how to determine such temperatures.

The plastification temperature may also be known as plastifization or softening temperature. In the present application these terms are considered equivalent.

For example for Nordic spruce having a moisture content in the range of 16 to 23% it has been found that the plastification temperature is approximately 50° C.-55° C.

Without wishing to be bound by any theory it is believed that when the temperature of the wood exceeds the plastification temperature the wood become easy deformable and susceptible to deformation by even modest pressure gradients, which may lead to damages of the wood.

Thus in a preferred embodiment according to the invention wood is treated with a supercritical fluid where the temperature of the wood is not exceeding the plastification temperature during pressurizing or depressurizing.

In a particular preferred embodiment according to the invention the process is performed so that the fluid used as supercritical fluid is not allowed to enter the liquid state inside the wood, and the temperature of the wood is not allowed to exceed the plastification temperature during pressurizing and depressurising.

Raising the temperature to above the plastification temperature of the wood may according to the invention increase the deposition of the compounds to be deposited. It is important that the pressure is not raised above the plastification temperature when large pressure gradients are present in the vessel in order to avoid damaging the wood. Therefore the raise of the temperature above the plastification temperature of the wood should not be performed before the holding pressure is reached or until the rate of pressure increase has slowed considerable. The temperature should be lowered to below the plastification temperature before the depressurising is started.

Raising the temperature above the plastification temperature of the wood may in some embodiments provide for a better deposition and a better adhesion of active compounds in the wood, which leads to higher impregnation efficiency and less leakage of the deposited active compounds after the treatment.

In order to treat wood using a carrier under high pressure information on the conditions inside the wood may be useful. This information, particular regarding temperature and pressure may be obtained by routine experimentations, e.g. by insertion of probes into a suitable number of pieces of wood and measuring the temperature and pressure during a test treatment using a high pressure. The person skilled in the art will appreciate that a suitable number of samples should by used for this test run, which number should be selected with regard to the heterogeneity of the batch etc.

The invention may also be used without detailed knowledge of the conditions inside the wood. The present application teaches that conditions, where the carrier exists in a liquid form should not arise inside the wood and the temperature of the wood should not exceed the plastification temperature of the wood during pressurizing and depressurizing of the vessel. The skilled person will appreciate how to avoid such conditions. Measures that may be applied are measures that lead to a move away from the border between supercritical fluid and liquid i.e. pressure and temperature, and preferably temperature, taking care of not to exceed the plastification temperature.

In one preferred embodiment heat is supplied to the vessel, in which the supercritical treatment takes place, during the de-pressurizing. The amount of heat to be supplied must be sufficient to secure that the conditions inside the wood do not allow the fluid used in the treatment to exist in a liquid form. For example if the supercritical fluid is carbon dioxide a temperature above the critical temperature of 31° C. will secure that no liquid carbon dioxide occur.

The temperature may be measured by insertion of a temperature sensor e.g. a thermometer in one or more specimens at each run or in a representative number of specimens during a test run.

The means available for the skilled person in order to adjust the temperature during the treatment comprises addition of fluid, withdrawal of fluid, addition of heat, withdrawal of heat and any suitable combination of these.

In one embodiment the heat is supplied to the vessel by feeding and withdrawing supercritical fluid simultaneously where the temperature of the fluid being fed into the vessel is higher that the temperature of the fluid being withdrawn, and the amount of the fluid being fed is less that the amount being withdrawn.

In another preferred embodiment depressurising is performed by the following steps:
(a) Removal of carrier from the vessel until a pressure and temperature below the starting condition is reached;
(b) Addition of supercritical fluid having a temperature higher than the fluid in the vessel until a pressure lower than the starting pressure in step (a) and/or adding heat to the vessel;
c) Repetition of step (a) and (b) one or more times;
d) When the pressure is sufficient low releasing the pressure until the approximately atmospheric pressure, and removal of the treated wood.

The person skilled in the art will appreciate that during step (a), the temperature will drop in the vessel and inside the wood samples.

Figure 3:
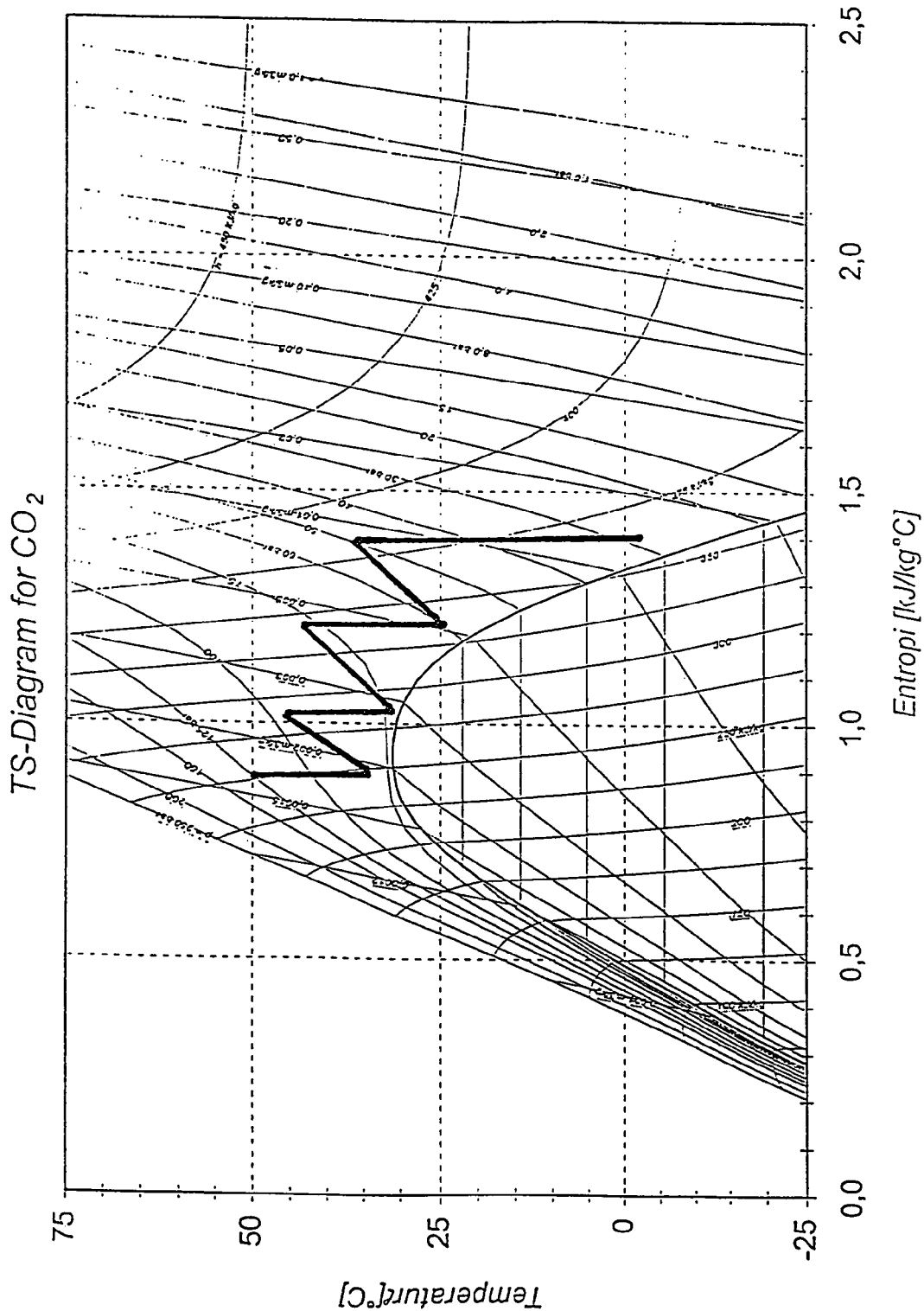
FIG. 3 shows a TS diagram for carbon dioxide with a preferred path for depressurising.

In this embodiment a path in a TS diagram as outlined in FIG. 3 is followed, where the path indicated is the condition in the centre of the wood.

The number and heights of each step (a), as well as the temperature difference between the fluids being withdrawn and being fed in step (b) can be determined by routinely experiments with regard to the TS diagram. It is preferred that the number of steps is between 2 and 10 most preferred between 3 and 6. The height of each step is preferably between 5 and 50 bars; more preferred between 10 and 30 bars and most preferred 15-25 bars.

One preferred method comprises following steps:
a) a vessel is charged with wood to be treated;
b) the vessel is pressurized using the carrier fluid until the treatment pressure is reached;
c) a holding period where the pressure is essentially constant or the pressure changes at a low rate;
d) depressurising the vessel to ambient temperature followed by removal of the treated wood.

As preferred pressures and temperature can be mentioned:
A treatment, wherein the supercritical treatment pressure in step c) is in the range of 85-300 bar, preferably in the range of 100-200 bar, more preferred in the range of 120-170 bar and most preferred in the range of 140-160 bar.
A treatment, wherein the temperature of the carrier fluid in the wood is above 10° C., preferably above 20° C., preferably above 25° C., preferably above 30° C., more preferred above 32.5° C. and most preferred above 35° C.
A treatment, wherein the temperature of the carrier in the wood is in the range of 25-65° C., preferably in the range of 31-55° C. in step b) and d) when the pressure is above 30 bar.
A treatment, wherein the temperature during step b) and d) is below 65° C., preferably below 60° C., preferably below 55° C., more preferred below 50° C. and most preferred below 45° C.
A treatment, wherein the temperature during step d) is above 45° C., preferably above 50° C., preferably above 55° C. and more preferred above 60° C. when the pressure is above 30 bar.

When the pressure has been reduced to 10-30 bars it may be released to atmospheric pressure without further measures (step (d)).

It will be understood that damages may also be avoided by reducing the speed of pressure reduction. In this way the depressurising will take longer time which secures a better heat distribution and consequently the temperature in the centre is not allowed to drop as much as if the pressure was released with a higher speed. Further more time will be available for the supercritical fluid inside the wood to flow out of the wood. Consequently the formed pressure gradients will be less steep. However from an industrial point of view this solution is not attractive because the longer time used for pressure reduction means that each batch occupy the plant for a longer period of time, which again means that the productivity of the plant is reduced.

The invention is now further illustrated by the following examples, which are intended as illustration of the invention and should not be regarded as limiting in any way.

EXAMPLES

Example 1

Determination of the Critical Length

For this determination Sprouse wood samples obtained from Lilleheden, Denmark, were used.

Samples having lengths in the range of 0.25 to 1.2 m were impregnated under supercritical conditions using carbon dioxide as the solvent.

The samples were impregnated at a temperature of 55° and a pressure of 150 bar using 50 g biocide corresponding to a deposition of 0.25 kg biocide per $m^3$ wood.

After impregnation for 20 minutes the pressure in the vessel was released according to the courses listed in table 1. below.

When the pressure reached atmospheric pressure the vessel was opened and the samples removed and inspected visually for damages.

TABLE 1

|  | Length (m) | | | | | | |
| --- | --- | --- | --- | --- | --- | --- | --- |
|  | 0.25 | 0.25 | 0.5 | 0.75 | 1.0 | 1.2 | 1.2 |
| Time for Pressure release 150-85 bar (min) | 20 | 40 | 20 | 20 | 20 | 20 | 40 |
| Time for pressure release 85-20 bar (min) | 40 | 60 | 40 | 40 | 40 | 40 | 60 |
| Time for pressure release 20-1 bar (min) | 40 | 40 | 40 | 40 | 40 | 40 | 40 |
| damaged | no | no | no | no | no | yes | yes |

From the results it appears that the critical length of the wood is 1.2 m. Further it can be seen that slowing the pressure release and thereby extending the time for pressure release 150-85 bars from 20 to 40 minutes and 85-20 bar from 40 to 60 minutes did not change the critical length.

Figure 4:
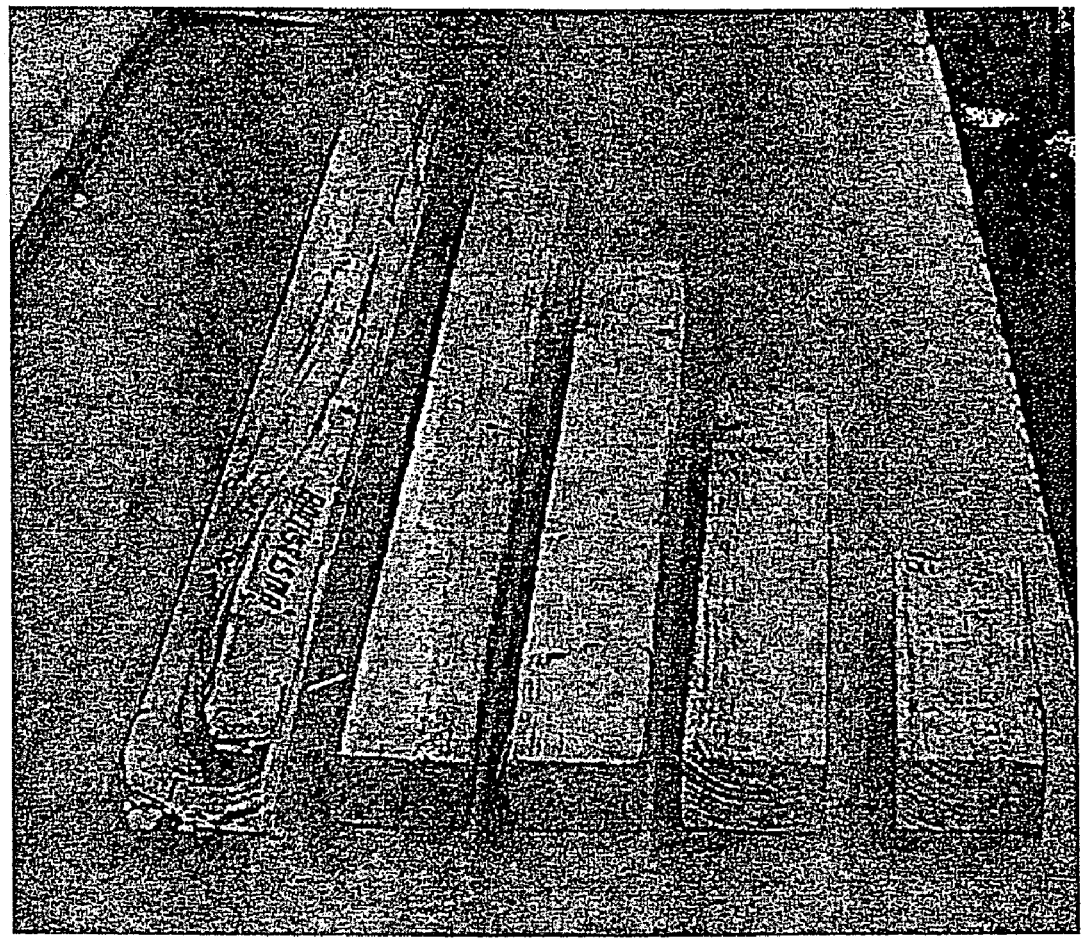
FIG. 4 shows a photograph of wood samples after treatment under supercritical conditions where the pressure of the treatment vessel was released without use of the precautions according to the invention. The length of the samples are from left to right 1.2 m, 1.0 m, 0.75 m, 0.5 m and 0.25 m.

In FIG. 4 the samples are shown where it is obvious that the sample of 1.2 m is severely damaged, whereas the other samples are not damaged.

Example 2

Effect of Temperature on the Number of Damages

This example demonstrates the dependence of the temperature on the number of damages.

In a vessel were common 1"×3" spruce boards treated using supercritical carbon dioxide as the medium. The boards had a total length of 1.5 m. In order to mimic boards having a length of 3 m boards were blinded in one end so that the medium was only capable of entering the boards in one end.

Different pressures, temperatures and depressurising times were selected as indicated in table 1, and the damage rate was calculated as the percentage of boards having one or more damages.

TABLE 2

| Length (m) | Temperature (° C.) | Time for depressurising (min.) | Rate of damage (%) |
|---|---|---|---|
| 1.5 | 45 | 39 | 22 |
| 3 | 45 | 39 | 41 |
| 3 | 55 | 39 | 13 |
| 3 | 65 | 39 | 5 |
| 3 | 55 | 90 | 7 |
| 3 | 65 | 90 | 0 |

From the data in table 2 it can be deduces that the length of the boards has a significant influence on the damage rate from 22-41 percent with in increase in length from 1.5 to 3 m.

Further it can be deduced that the treatment temperature i.e. the initial temperature before depressurising, has a marked influence on the damage rate. At a depressurising time of 39 minutes a decrease from 41% to 5% at a temperature from 45° C. to 65° C. respectively, can be observed.

A similar decease can be observed for a time for depressurising at 90 minutes, now on a lower level because of the longer time.

The invention claimed is:

1. A method of treatment of wood susceptible to damage using a carrier fluid under pressure, wherein the wood has a length above a critical length, and the carrier fluid is under a pressure of at least 20 bar and at a temperature below 65° C. and has a critical point at a temperature of 20-50° C. and a pressure of 5-100 bar, comprising:
   a) charging a vessel with wood to be treated;
   b) pressurizing the vessel using the carrier fluid until the treatment pressure is reached;
   c) providing a holding period in which the pressure is essentially constant or the pressure changes at a low rate; and
   d) depressurizing the vessel to ambient temperature, followed by removing the treated wood, characterized in that the fluid is not allowed to exist in its liquid form inside the wood and that during at least one of the pressurizing step and the depressurizing step, the fluid inside the wood is kept out of its liquid form by supplying heat to the vessel, and wherein, in at least one initial sample of the wood, the temperature inside the wood is monitored by inserting a temperature sensor in at least one specimen of the wood, and the temperature of the carrier fluid inside the vessel is adjusted, when needed, in response to the monitoring to ensure that the fluid inside the wood is not in its liquid form.

2. The method according to claim 1, wherein the treatment is selected among impregnation, extraction, dying or drying.

3. The method according to claim 2, wherein the treatment is an impregnation and an active component is added to the system in a) or b).

4. The method according to claim 3, wherein the treatment takes place at least partially in the supercritical state.

5. The method according to claim 4, wherein the supercritical treatment pressure in c) is in the range of 85-300 bar.

6. The method according to claim 4, wherein the temperature of the carrier fluid in the wood is above 10 C.

7. The method according to claim 6, wherein the temperature of the carrier in the wood is in the range of 25-65 C in b) and d) when the pressure is above 30 bar.

8. The method according to claim 1, wherein the temperature of the wood is below the plastification temperature of the wood during b).

9. The method according to claim 1, wherein the temperature during b) and d) is below 65 C.

10. The method according to claim 1, wherein the carrier comprises carbon dioxide.

11. The method according to claim 1, wherein heat is extracted during d).

12. The method according to claim 1, wherein heat is added during b).

13. The method according to claim 1, wherein the wood susceptible to damage is selected among a refractory wood species.

14. The method according to claim 13, wherein the wood susceptible to damage is selected among: spruce, Engelman spruce and western red cedar.

15. The method according to claim 1, wherein the temperature is raised above the plastification temperature during c).

16. The method according to claim 1, wherein the temperature during d) is above the plastification temperature when the pressure is above 30 bar.

17. The method according to claim 16, wherein the temperature during d) is above 45 C when the pressure is above 30 bar.

18. The method according to claim 1, wherein the depressurizing is performed by:
   i) removing fluid from the vessel until a pressure and temperature in the supercritical state but below the starting condition is reached;
   ii) adding and/or heat until a pressure that is lower than the starting pressure in i) is reached;
   iii) repeating i) and ii) one or more times;
   iv) when the pressure is sufficiently low, releasing the pressure until approximately atmospheric pressure is reached, and removing the treated wood.

19. The method according to claim 1, wherein the wood is spruce and the temperature is higher than 31° during the process and lower than 55° during the pressurizing and depressurising.

20. A method for establishing the conditions for a treatment according to claim 1 of wood susceptible to damage, wherein the wood has a length that is over the critical length, with a supercritical fluid characterised in that the treatment is conducted in a way so the critical fluid is not allowed to exist in its liquid form inside the wood, wherein the temperature inside the wood is monitored by inserting a temperature sensor in at least one specimen of the wood, and the temperature of the carrier fluid inside the vessel is adjusted, when needed, in response to the monitoring to ensure that the fluid inside the wood is not in its liquid form.

21. The method according to claim 20, wherein the temperature of the wood during pressurizing and depressurizing is below the plastification temperature of the wood.

* * * * *